United States Patent
Qi et al.

(10) Patent No.: US 10,848,918 B2
(45) Date of Patent: Nov. 24, 2020

(54) METHOD AND SERVER FOR POSITIONING USER EQUIPMENT

(71) Applicant: Telefonaktiebolaget LM Ericsson (publ), Stockholm (SE)

(72) Inventors: Kunpeng Qi, Shanghai (CN); Fang Li, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/477,928

(22) PCT Filed: Feb. 13, 2017

(86) PCT No.: PCT/CN2017/073360
§ 371 (c)(1),
(2) Date: Jul. 15, 2019

(87) PCT Pub. No.: WO2018/145312
PCT Pub. Date: Aug. 16, 2018

(65) Prior Publication Data
US 2019/0373417 A1    Dec. 5, 2019

(51) Int. Cl.
*H04W 4/029* (2018.01)
*G01S 5/02* (2010.01)
(Continued)

(52) U.S. Cl.
CPC ........... *H04W 4/029* (2018.02); *G01S 5/0242* (2013.01); *H04W 4/023* (2013.01); *H04W 64/003* (2013.01); *G06F 2203/0338* (2013.01)

(58) Field of Classification Search
CPC . H04W 64/006; H04W 4/029; H04W 64/003; H04W 64/00; G01S 5/0252
See application file for complete search history.

(56) References Cited

U.S. PATENT DOCUMENTS 8,315,610 B2 * 11/2012 Hasemann ............. H04W 4/12
455/414.2
8,478,333 B2 * 7/2013 Kato ....................... H04W 8/26
370/310
(Continued)

FOREIGN PATENT DOCUMENTS

CN    102281566 A    12/2011
CN    103796308 A    5/2014
(Continued)

OTHER PUBLICATIONS

International Search Report and Written Opinion of the International Searching Authority, PCT/CN2017/073360, dated Nov. 2, 2017, 12 pages.
(Continued)

*Primary Examiner* — Matthew C Sams
(74) *Attorney, Agent, or Firm* — Patent Portfolio Builders, PLLC (57) ABSTRACT

Method and server are disclosed for positioning user equipment (UE). According to an embodiment, positioning-related information is collected for each of a plurality of UEs from at least one network node for at least a first duration of time. For each UE, matching positioning-related information is determined that is matched with the UE's registration address related information, wherein the plurality of UEs' registration addresses are obtained from a network provider. A reference database is created which contains, for each UE, a reference point comprising the UE's identification (ID), registration address related information and matching positioning-related information. In response to a positioning request, a UE's current positioning-related information is acquired from a network node. The UE is positioned based on its current positioning-related information and the reference database.

14 Claims, 4 Drawing Sheets

(51) Int. Cl.
  *H04W 4/02* (2018.01)
  *H04W 64/00* (2009.01)

(56) References Cited

U.S. PATENT DOCUMENTS

| | | | | |
|---|---|---|---|---|
| 9,565,527 B1* | 2/2017 | Anderson | | H04W 4/023 |
| 2005/0043042 A1* | 2/2005 | Hwang | | H04W 64/00 |
| | | | | 455/456.2 |
| 2005/0255853 A1* | 11/2005 | Ewert | | H04W 4/029 |
| | | | | 455/456.1 |
| 2006/0073788 A1* | 4/2006 | Halkka | | H04M 1/72572 |
| | | | | 455/41.2 |
| 2006/0148488 A1* | 7/2006 | Syrbe | | G01C 21/20 |
| | | | | 455/456.1 |
| 2008/0146189 A1* | 6/2008 | Doumi | | H04L 12/66 |
| | | | | 455/404.1 |
| 2009/0209202 A1* | 8/2009 | Martini | | H04W 12/02 |
| | | | | 455/41.2 |
| 2011/0028164 A1* | 2/2011 | Kato | | H04W 8/08 |
| | | | | 455/456.1 |
| 2013/0160138 A1* | 6/2013 | Schultz | | G06F 21/6254 |
| | | | | 726/27 |
| 2015/0091757 A1* | 4/2015 | Shaw | | H04W 64/006 |
| | | | | 342/385 |
| 2015/0215762 A1* | 7/2015 | Edge | | H04W 8/005 |
| | | | | 370/338 |
| 2015/0230100 A1* | 8/2015 | Atia | | H04W 16/18 |
| | | | | 370/252 |
| 2015/0304818 A1* | 10/2015 | Carlsson | | H04W 4/029 |
| | | | | 455/456.1 |
| 2016/0005003 A1* | 1/2016 | Norris | | G06Q 10/10 |
| | | | | 705/7.19 |
| 2018/0164400 A1* | 6/2018 | Wirola | | H04L 67/18 |
| 2018/0332558 A1* | 11/2018 | Chan | | H04W 64/00 |

FOREIGN PATENT DOCUMENTS

| | | | | |
|---|---|---|---|---|
| CN | 104869535 A | | 8/2015 | |
| CN | 105282844 A | | 1/2016 | |
| CN | 108513297 A | * | 9/2018 | |
| EP | 2934052 A1 | | 10/2015 | |
| KR | 20100030349 A | | 3/2010 | |
| WO | 2007/048028 A2 | | 4/2007 | |
| WO | WO-2009125812 A1 | * | 10/2009 | H04W 8/08 |
| WO | 2011/040856 A1 | | 4/2011 | |
| WO | 2013/159835 A1 | | 10/2013 | |

OTHER PUBLICATIONS

3GPP TR 36.942 V12.0.0 (Sep. 2014), 3rd Generation Partnership Project; Technical Specification Group Radio Access Network; Evolved Universal Terrestrial Radio Access (E-UTRA); Radio Frequency (RF) system scenarios (Release 12), 109 Pages.
Feng Yin et al., "Received-Signal-Strength Threshold Optimization Using Gaussian Processes", 13 Pages.
Bo-Chieh Liu et al., "Cellular Geolocation Employing Hybrid of Relative Signal Strength and Propagation Delay", Department of Electrical Engineering, National Sun Yat-Sen University, Kaohsiung, 80424, Taiwan, 2006 IEEE, 6 Pages.
European Search Report issued in corresponding Application No. 17895727.0 dated Dec. 10, 2019; 09 pages. The reference not cited therein has been previously made of record.

* cited by examiner

METHOD AND SERVER FOR POSITIONING USER EQUIPMENT

This application is a 35 U.S.C. § 371 national stage application of PCT International Application No. PCT/CN2017/073360 filed on Feb. 13, 2017, the disclosure and content of which is incorporated by reference herein in its entirety.

TECHNICAL FIELD

Embodiments of the disclosure generally relate to wireless communication, and, more particularly, to method and server for positioning user equipment.

BACKGROUND

Accurately determining the geographic position of a mobile user within a wireless communication network is an ongoing challenge of wireless telecommunications development. Governments' mandates such as the E-911 positioning requirements in North America, and commercial location based services (LBSs) demand rapid and accurate position determination. The accurate positioning of a user equipment (UE) would become more challenging considering the indoor scenarios where assisted global positioning system (GPS) signals are less detectable. Currently, there are several position determination methods with varying accuracy and complexity. They include enhanced cell identification (ID) positioning, time difference of arrival (TDOA) positioning, fingerprinting positioning and assisted GPS (A-GPS) positioning.

In the above conventional positioning methods, position is computed according to signal measurements (e.g., signal strength, timing, or the like). Because of signal attenuation, reflection and scattering, sometimes the measured values are not exact, and result in poor positioning results. Therefore, it would be desirable to provide an effective solution for positioning UE.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

One of the objects of the disclosure is to provide an effective solution for positioning user equipment.

According to one aspect of the disclosure, it is provided a method for positioning user equipment (UE). The method comprises collecting, for each of a plurality of UEs, positioning-related information from at least one network node for at least a first duration of time. The method further comprises determining, for each UE, matching positioning-related information that is matched with the UE's registration address related information, wherein the plurality of UEs' registration addresses are obtained from a network provider. The method further comprises creating a reference database containing, for each UE, a reference point that comprises the UE's identification (ID), registration address related information and matching positioning-related information. The method further comprises in response to a positioning request, acquiring, from a network node, a UE's current positioning-related information. The method further comprises positioning the UE based on its current positioning-related information and the reference database.

Optionally, the step of positioning comprises determining whether the reference database contains a matching reference point that is matched with the UE's current positioning-related information. The step of positioning further comprises in response to a positive determination result, determining the registration address related information in the matching reference point as the UE's current position information. The step of positioning further comprises in response to a negative determination result, estimating the UE's current area based on its current positioning-related information. The step of positioning further comprises determining the UE's current position based on the reference points in the UE's current area and its current positioning-related information.

Optionally, determining the UE's current position comprises determining whether the reference points in the UE's current area can support fingerprinting positioning. Determining the UE's current position further comprises in response to a positive determination result, calculating the UE's current position through fingerprinting positioning. Determining the UE's current position further comprises in response to a negative determination result, checking whether the reference points in the UE's current area can support Gaussian process regression (GPR) positioning. Determining the UE's current position further comprises in response to a positive check result, calculating the UE's current position through GPR positioning. Determining the UE's current position further comprises in response to a negative check result, calculating the UE's current position through propagation model positioning.

Optionally, determining matching positioning-related information comprises extracting one or more sets of similar positioning-related information that last for at least a second duration of time. Determining matching positioning-related information further comprises estimating one or more positions based on the one or more sets of similar positioning-related information. Determining matching positioning-related information further comprises determining, as the matching positioning-related information, the set of similar positioning-related information for which the estimated position is matched with the UE's registration address related information.

Optionally, the registration address related information comprises the registration address and a ground truth determined based on the registration address.

Optionally, the positioning-related information comprises: measured information that is created by a UE or a network node, and can be used to position the UE; and time at which the measured information is received or created.

Optionally, the measured information comprises one of, or a combination of the following: one or more cell IDs detected by a UE; power level and signal-to-noise ratio (SNR) for a signal received by a UE from one or more cells; power level and SNR for a signal received by a network node from a UE; angle of arrival (AoA) for a signal received by a network node from a UE; and timing advance (TA) between a UE and a cell.

According to another aspect of the disclosure, it is provided a method for positioning user equipment (UE). The method comprises in response to a positioning request, acquiring, from a network node, a UE's current positioning-related information. The method further comprises positioning the UE based on its current positioning-related information and a reference database. The reference database contains, for each UE of a plurality of UEs, a reference point that comprises the UE's identification (ID), registration address related information and matching positioning-related information that is matched with the registration address related information. The plurality of UEs' registration addresses are obtained from a network provider.

According to another aspect of the disclosure, it is provided a positioning server for positioning user equipment (UE). The positioning server comprises a processor and a memory. The memory contains instructions executable by the processor, whereby the positioning server is operative to collect, for each of a plurality of UEs, positioning-related information from at least one network node for at least a first duration of time. The instructions are executable by the processor, whereby the positioning server is further operative to determine, for each UE, matching positioning-related information that is matched with the UE's registration address related information, wherein the plurality of UEs' registration addresses are obtained from a network provider. The instructions are executable by the processor, whereby the positioning server is further operative to create a reference database containing, for each UE, a reference point that comprises the UE's identification (ID), registration address related information and matching positioning-related information. The instructions are executable by the processor, whereby the positioning server is further operative to, in response to a positioning request, acquire, from a network node, a UE's current positioning-related information. The instructions are executable by the processor, whereby the positioning server is further operative to position the UE based on its current positioning-related information and the reference database.

According to another aspect of the disclosure, it is provided a positioning server for positioning user equipment (UE). The positioning server comprises a processor and a memory. The memory contains instructions executable by the processor, whereby the positioning server is operative to, in response to a positioning request, acquire, from a network node, a UE's current positioning-related information. The instructions are executable by the processor, whereby the positioning server is further operative to position the UE based on its current positioning-related information and a reference database. The reference database contains, for each UE of a plurality of UEs, a reference point that comprises the UE's identification (ID), registration address related information and matching positioning-related information that is matched with the registration address related information. The plurality of UEs' registration addresses are obtained from a network provider.

According to another aspect of the disclosure, it is provided a positioning server for positioning user equipment (UE). The positioning server comprises a training module, a positioning module and a storage device. The training module is configured to collect, for each of a plurality of UEs, positioning-related information from at least one network node for at least a first duration of time. The training module is further configured to determine, for each UE, matching positioning-related information that is matched with the UE's registration address related information, wherein the plurality of UEs' registration addresses are obtained from a network provider. The training module is further configured to create a reference database containing, for each UE, a reference point that comprises the UE's identification (ID), registration address related information and matching positioning-related information. The storage device stores the created reference database. The positioning module is configured to, in response to a positioning request, acquire, from a network node, a UE's current positioning-related information. The positioning module is further configured to position the UE based on its current positioning-related information and the reference database.

According to another aspect of the disclosure, it is provided a computer program. The computer program comprises instructions which when executed by at least one processor, cause the at least one processor to perform the method according to the above aspect.

According to another aspect of the disclosure, it is provided a computer readable storage medium. The computer readable storage medium comprises instructions which when executed by at least one processor, cause the at least one processor to perform the method according to the above aspect.

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As mentioned above, enhanced cell ID positioning is a commonly used positioning method. Specifically, a UE measures the power level information for signals received from observable cells and reports it to the network such as evolved serving mobile location center (E-SMLC). The cell may report to the network extra information such as angle of arrival (AoA), timing advance (TA) value which holds information about the delay in the air interface between the UE and the cell antenna. The network estimates the UE's position based on the above information and its knowledge of the cells' positions.

Enhanced cell ID positioning mainly comprises propagation model positioning and Gaussian process regression (GPR) positioning. Propagation model is widely used in enhanced cell ID positioning. Assume that an omni-directional antenna is used. Then, the measured power level can be expressed as:

$$RX\_PWR = TX\_PWR - \text{Pathloss}, \quad (1)$$

where RX_PWR is the received signal power, and TX_PWR is the transmitted signal power. TX_PWR is semi-static for a cell which may be only updated by the network operator. Macro cell propagation model for urban area can be given by the following formula:

$$PL_i(p) = 40*(1-4*10^{-3}*Dhb)*\log_{10}(R) - 18*\log_{10}(Dhb) + 21*\log_{10}(f) + 80 \text{ db}, \quad (2)$$

where p is a UE's position, $PL_i(p)$ is the path loss at the UE's position, i means the $i^{th}$ cell, Dhb is the base station (BS) antenna height in meters, measured from the average rooftop level, R is the BS-UE separation in kilometers, and f is the carrier frequency in MHz.

Considering a carrier frequency of 900 MHz and a BS antenna height of 15 meters above the average rooftop level, the above propagation model is given by the following formula:

$$PL_i(p)=120.9+37.6*\log_{10}(R). \quad (3)$$

In this way, the BS-UE separation R can be calculated from the path loss $PL_i(p)$, i.e. the difference between the transmitted signal power and received signal power. Then trilateration method can be used to determine the UE's position. Additionally, the TA can be used to improve the accuracy.

This method may be called as enhanced cell ID with propagation model. The details of this method are described in, inter alia, 3GPP TR 36.942 entitled "Technical Specification Group Radio Access Network; Evolved Universal Terrestrial Radio Access (E-UTRA); Radio Frequency (RF) system scenarios (Release 12)" and "Cellular Geolocation Employing Hybrid of Relative Signal Strength and Propagation Delay" (Bo-Chieh Liu and Ken-Huang Lin, IEEE Wireless Communications and Networking Conference, WCNC, 2006), which are incorporated herein by reference in their entirety. However, this method is highly sensitive to errors caused by signal attenuation, reflection and scattering.

Compared with propagation model positioning, GPR positioning can achieve a better accuracy. The pre-condition is that there are some known location and path loss pairs. Specifically, the path loss can be modeled by the following formula:

$$PL_i(p)=A_i+B_i \log_{10}(R)+e_i(p), \quad (4)$$

where p, $PL_i(p)$, i and R represent the same meanings as described above, $A_i$ is the path loss measured at a reference distance of 1 meter, $B_i$ is the path loss exponent, and $e_i(p)$ is the measurement error term. Due to large-scale shadowing effect, $e_i(p)$ follows a zero-mean Gaussian distribution, i.e. $e_i(p) \sim N(0,\sigma_{s,i}^2)$, where $N(\mu, \sigma^2)$ represents a Gaussian distribution with mean $\mu$ and variance $\sigma^2$.

The measurement error terms (due to the shadowing effect) at two different positions, say p and p', are assumed to be spatially correlated according to the well-established Gudmundson's model, concretely, $$E[e_i(p)e_i(p')] = \sigma_{s,i}^2 \exp\left[\frac{-\|p-p'\|}{l_{c,i}}\right], \quad (5)$$

where $E(\cdot)$ represents the statistical expectation, $\|\cdot\|$ represents the Euclidean norm of a vector, and $l_{c,i}$ is called as the correlation distance.

The above nonlinear GPR model can be completely specified by its mean function and covariance function, namely, $$PL_i(p) \sim GP(m_i(p), k_i(p,p')), \quad (6)$$

where $$m_i(p) \triangleq E|PL_i(p)|=A_i+B_i \log_{10}(\|p-p_{r,i}\|), \quad (7a)$$

$$k_i(p,p') \triangleq E[(PL_i(p)-m_i(p))(PL_i(p')-m_i(p'))], \quad (7b)$$

where $GP(\cdot, \cdot)$ represents a Gaussian process, and $p_{r,i}$ is a reference position.

Here, offline GPR is described as an example. In the offline calibration phase, a training data set can be given as follows:

$$D_i=\{(p_{i,j},r_i(p_{i,j}))|j=1,2,\ldots,M\}, \quad (8)$$

where $r_i(p_{i,j})$ represents the radio signal strength (RSS) measurement at position $p_{i,j}$. The likelihood function of the observed path losses can be written as follows:

$$\text{LIKELIHOOD}(PL_i(P_i);\theta_i) \sim N(m_i(P_i), C_i(P_i,P_i)), \quad (9)$$

where $$\theta_i \triangleq [A_i, B_i, \sigma_{s,i}^2, l_{c,i}]^T, \quad (10)$$

$$P_i \triangleq [p_{i,1}, p_{i,2}, \ldots, p_{i,M}],$$

$$PL_i(P_i) \triangleq [PL_i(p_{i,1}), PL_i(p_{i,2}), \ldots, PL_i(p_{i,M})]^T,$$

$$m_i(P_i) \triangleq [m_i(p_{i,1}), m_i(p_{i,2}), \ldots, m_i(p_{i,M})]^T,$$

$$k_i(p, P_i) \triangleq [k_i(p, p_{i,1}), k_i(p, p_{i,2}), \ldots, k_i(p, p_{i,M})]^T,$$

$$K_i(P_i, P_i) \triangleq \begin{bmatrix} k_i(p_{i,1}, P_i) \\ k_i(p_{i,2}, P_i) \\ \ldots \\ k_i(p_{i,M}, P_i) \end{bmatrix}$$

$$C_i(P_i, P_i) \triangleq K_i(P_i, P_i).$$

The parameters in $\theta_i$ are usually unknown and need to be calibrated. These parameters can be calculated by using maximum-likelihood estimation (MLE).

In the positioning phase, the Gaussian posterior probability of an observed path loss at a new position p* can be computed by:

$$\text{probability}(PL_i(p^*)|D_i;\theta_i) \sim N(u_i(p^*), \sigma_i^2(p^*)), \quad (11)$$

where $$u_i(p^*)=k_i^T(p^*)\cdot C_i^{-1}(PL_i-m_i)+m_i(p^*), \quad (12a)$$

$$\sigma_i^2(p^*)=\sigma_{s,i}^2-k_i^T(p^*)\cdot C_i^{-1}\cdot k_i(p^*), \quad (12b)$$

where $PL_i$, $m_i$, $k_i(p^*)$, and $C_i$ in formulas (12a) and (12b) are short for $PL_i(P_i)$, $m_i(P_i)$, $k_i(p^*, P_i)$, and $C_i(P_i, P_i)$. Given an observed path loss, for each of a plurality of positions distributed (e.g., uniformly) within an area where the UE possibly occurs, a corresponding probability can be calculated according to formula (11). Then, the position with the maximum probability can be determined as the UE's position. In this way, the propagation model can be simulated more exactly according to the GPR. The TA can also be used in the GPR positioning method to improve accuracy.

In the above analysis, an omni-directional antenna is used for a cell. For a directional antenna, the antenna radiation pattern shall be considered. The details of this method are described in, inter alia, "Received-Signal-strength Threshold Optimization Using Gaussian Process" (Feng Yin, Fredrik Gunnarsson, Fredrik Gustafsson, IEEE 2016), which is incorporated herein by reference in its entirety.

As mentioned above, existing positioning methods further comprises TDOA positioning, fingerprinting positioning, and A-GPS positioning. The TDOA method such as observed TDOA (OTDOA) relies on measurements, typically on some pilot radio signal, from multiple long term evolution (LTE) evolved node Bs (eNodeBs). With OTDOA, a UE measures the timing differences of downlink reference signals received from multiple distinct locations. For each measured neighbor cell, the UE measures reference signal time difference (RSTD) which is the relative timing difference between a neighbor cell and the reference cell. The UE position estimate is then found as the intersection of hyperbolas corresponding to the measured RSTDs. At least three measurements from geographically dispersed base stations with a good geometry are needed to solve for two coordinates of the UE and the receiver clock bias. In order to solve for the UE's position, precise knowledge of the transmitter locations and transmit timing offset is needed. Position calculation can be conducted, for example, by a positioning server such as E-SMLC in LTE or UE. The former approach corresponds to the UE-assisted positioning mode, while the latter corresponds to the UE-based positioning mode.

Fingerprinting positioning provides an accuracy somewhere in between the high precision positioning methods and the enhanced cell ID methods. Fingerprinting positioning algorithms can operate by creating a radio reference fingerprint for each point of a fine coordinate grid that covers the radio access network (RAN). The reference fingerprint may for example comprise the cell IDs that are detected by a UE in each grid point; quantized path loss or signal strength measurements, with respect to multiple cells, performed by the UE in each grid point; quantized TA in each grid point.

An associated ID of the cell may also be needed. Whenever a positioning request arrives, a radio reference fingerprint is first measured, after which the corresponding grid point is looked up and reported. This requires that the point is unique. The positioning is conducted by comparing the signal information of the fingerprint received from the UE with the signal information of the reference fingerprints, and returning the location of the best matching reference fingerprints. One variant of this method is described in, inter alia, "Adaptive enhanced cell-ID fingerprinting positioning by clustering of precise position measurements" (T. Wigren, IEEE Trans. Vehicular Tech., Vol. 56, No. 5, 2007), which is incorporated herein by reference in its entirety.

A-GPS positioning is an enhancement of the GPS. Local GPS reference receiver network/global reference receiver network collects assistance data from GPS satellites, such as ephemeris data. The assistance data, when transmitted to GPS receivers in UEs connected to the cellular communication system, enhances the performance of the UEs' GPS receivers. Typically, A-GPS accuracy can become as good as ten meters without differential operation. The accuracy becomes worse in dense urban areas and indoors where the sensitivity is most often not high enough for detection of very weak signals from the GPS satellites.

In the above conventional positioning methods, position is computed according to signal measurements (e.g., signal strength, timing, or the like). Because of signal attenuation, reflection and scattering, sometimes the measured values are not exact, and result in poor positioning results.

The present disclosure proposes a solution for positioning UE. It can achieve a better positioning accuracy by considering mobile users' habits (for example, people mostly stay at home and in office). Hereinafter, the solution will be described in detail with reference to FIGS. 1-7.

Figure 1:
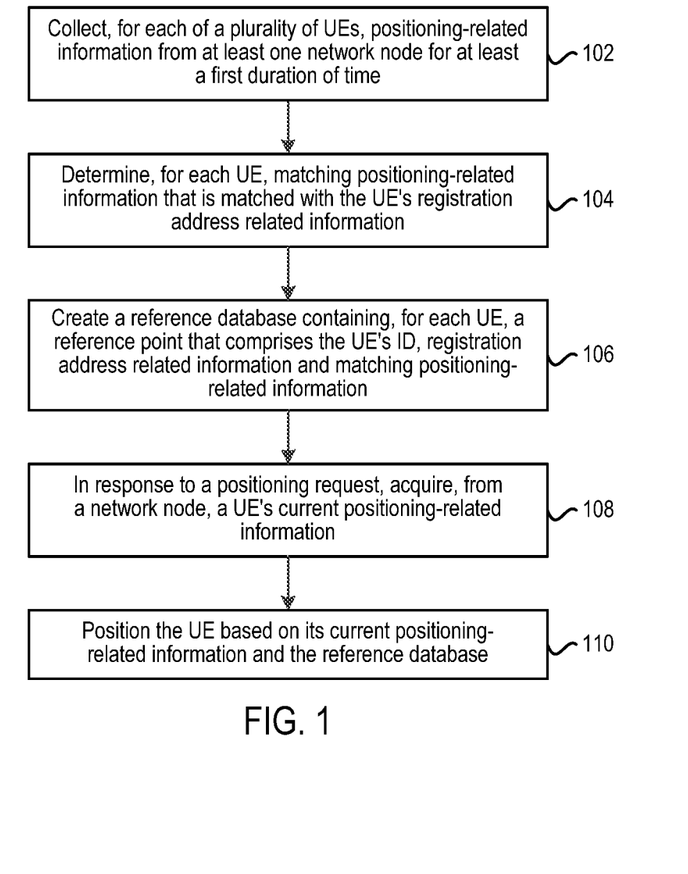
FIG. 1 is a flowchart illustrating a method for positioning UE according to an embodiment of the disclosure.

FIG. 1 is a flowchart illustrating a method for positioning UE according to an embodiment of the disclosure. The method may be performed by for example the processor and the memory of a positioning server. At step 102, positioning-related information is collected for each of a plurality of UEs from at least one network node for at least a first duration of time.

The term network node (also interchangeably called as node) may refer to any type of network node which directly or indirectly communicates with a UE. It may be a radio network node or a node in a core network or a fixed part of the network. For example, it may be a network node serving the UE, a network node neighboring to the serving network node of the UE, any network node in the radio network or in the core network in the wireless communication system in which the UE operates. Examples of network nodes may comprise base station (BS), multi-standard radio (MSR) radio node such as MSR BS, LTE eNodeB, network controller, radio network controller, base station controller, relay, donor node controlling relay, base transceiver station (BTS), access point (AP), core network node such as mobile switching center (MSC) and mobility management entity (MME), operation and maintenance (O&M), operational support system (OSS), self organizing network (SON), location server (e.g., E-SMLC), or the like.

The term UE may refer to any type of wireless device communicating with a network node in a cellular or mobile communication system over radio interface. Examples of UE may comprise target device, device to device (D2D) UE, proximity-based service (ProSe) UE, machine type UE or UE capable of machine to machine communication (also known as category 0 UE, low cost and/or low complexity UE), personal digital assistant (PDA), iPAD, Tablet, mobile terminal, smart phone, laptop embedded equipment (LEE), laptop mounted equipment (LME), universal serial bus (USB) dongles, wireless device, or the like.

The plurality of UEs' IDs together with their registration addresses (e.g., in the form of a mapping table) may be obtained from a network provider. The ID of a UE may be for example international mobile subscriber identity (IMSI), mobile subscriber international ISDN number (MSISDN, where ISDN refers to integrated service digital network), or the like. The registration address of a UE may be for example home address, office address, or the like. The network provider may be for example telecom operator, other vendors, or the like.

For example, when a person buys a subscriber identity module (SIM) card or buys a mobile service from a telecom operator, the person's address (e.g., home address, office address, or the like) is provided to the telecom operator to receive the bill or to install broadband. In this way, the telecom operator possesses many users' MSISDNs and registered addresses. This information may be obtained from the telecom operator by, for example, any wired and/or wireless communications.

The positioning-related information may comprise: measured information that is created by a UE or a network node, and can be used to position the UE; and time at which the measured information is received or created. The measured information may comprise for example one of, or a combination of the following: one or more cell IDs that are detected by a UE; (e.g., quantized) power level and signal-to-noise ratio (SNR) for a signal received from one or more observable cells, performed by a UE; (e.g., quantized) power level and SNR for a signal received from a UE, performed by a network node; angle of arrival (AoA) for a signal received from a UE, performed by a network node; and timing advance (TA) between a UE and a cell. The TA value holds information about the delay in the air interface between the UE and the cell antenna, and may be used to calculate the distance between the UE and the cell.

The measured information may further comprise a UE's permanent or temporary ID (e.g., IMSI, MSISDN). It should be noted that in some systems, one network node (e.g., BS, OSS) can only provide a UE's temporary ID. In this case, a relation table between the UE's temporary ID and permanent ID can be obtained from another network node (for example, MME in LTE) firstly, and then the UE's permanent ID can be determined according to its temporary ID.

For example, a UE may measure the power level information and SNR for a signal received from the observable cells, and then report them to a network node. The network node may measure the power level information, SNR and AoA for a signal received from the UE. The TA value may be determined by the network node. The above measured information may be delivered from a network node (e.g., BS) to another network node (e.g., OSS). The above procedure has been already supported in most of the UEs, network nodes and OSS. Then, the above measured information together with the time at which the measured information is received or created may be collected by any wired and/or wireless communications.

The first duration of time for the collection operation can be sufficient to find mobile users' habits (for example, people are staying at home and in office). It may be for example a predefined duration of time (e.g., 24 hours). In the first duration of time, the collection operation may be performed continuously or intermittently.

Then, at step 104, for each UE, matching positioning-related information is determined which is matched with the UE's registration address related information. The registration address related information may comprise the registration address and a ground truth determined based on the registration address. As described above, the registration address can be obtained from the network provider. The ground truth may comprise the longitude and latitude of the registration address, and may also comprise its relative height. The ground truth may be determined from the registration address by using an electronic map (e.g., Google Earth). It is possible that one UE has more than one registration address, and each registration address has its ground truth (e.g., longitude, latitude, relative height). Step 104 may be implemented by converting the collected positioning-related information to corresponding position information and comparing it with registration address related information.

Figure 4:
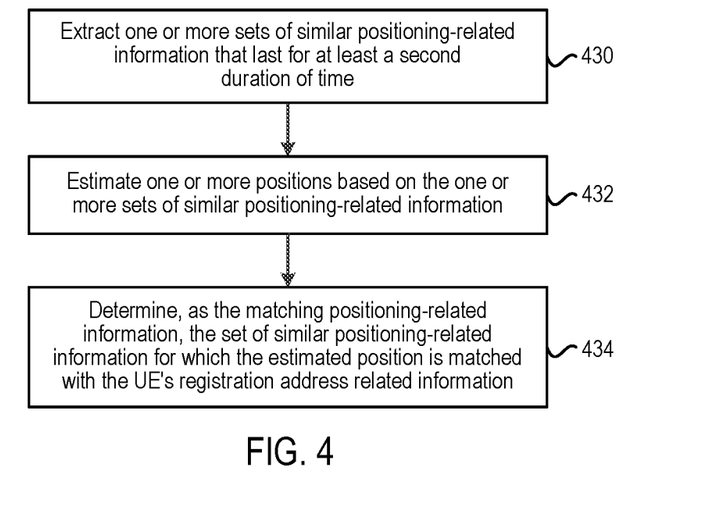
FIG. 4 is a flowchart for explaining the method of FIG. 1.

As an example, step 104 may be implemented as steps 430-434 of FIG. 4. At step 430, one or more sets of similar positioning-related information are extracted which last for at least a second duration of time. For a UE, a set of similar positioning-related information comprises multiple pieces of positioning-related information that have similar values of measured information (for example, varying around a certain value). The second duration of time may correspond to mobile users' habits (for example, people are staying at home and in office). Thus, it is shorter than the first duration of time. The second duration of time may be for example a predefined duration of time (e.g., 4 hours).

For instance, multiple sets of similar positioning-related information may be found. Then, the cumulative duration of each set of similar positioning-related information may be calculated based on the time information contained therein. Then, one or more sets of similar positioning-related information whose cumulative duration is greater than or equal to the second duration of time may be extracted. The extracted information means that the UE has stayed in one place for a long time.

At step 432, one or more positions are estimated based on the one or more sets of similar positioning-related information. This step may be implemented by using for example enhanced cell ID with propagation model method described above. The uncertainty of the position may also be estimated.

At step 434, the process determines, as the matching positioning-related information, the set of similar positioning-related information for which the estimated position is matched with the UE's registration address related information. For example, if the ground truth of the UE's registration address is within a predefined range (e.g., corresponding to the estimated uncertainty) of the estimated position, the estimated position shall be the registration address with very high probability, and thus may be considered to be matched with the registration address related information.

Then, at step 106, a reference database is created which contains, for each UE, a reference point comprising the UE's ID, registration address related information and matching positioning-related information. The matching positioning-related information may be stored as a piece of averaged measured information and its cumulative duration (e.g., from 09:00 PM to 06:00 AM).

Then, at step 108, in response to a positioning request, a UE's current positioning-related information is acquired from a network node. The positioning request may come from any entity who requires positioning the UE. For example, the requesting entity may be for example an application (e.g., location based service application), a government department, or the like. The acquisition operation of the UE's current positioning-related information may be similar to the collection operation of step 102, and thus its detailed description is omitted here.

Then, at step 110, the UE is positioned based on its current positioning-related information and the reference database. The UE's positioning result may be sent to the requesting entity.

Figure 2:
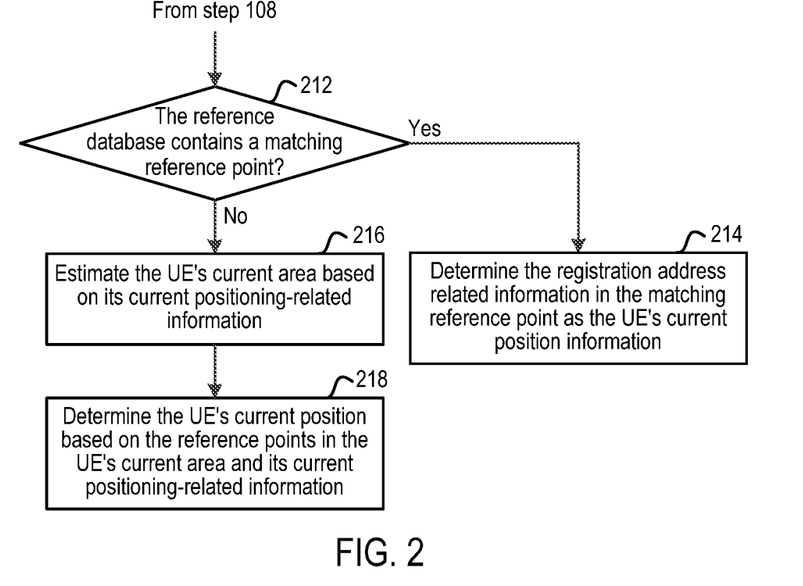
FIG. 2 is a flowchart for explaining the method of FIG. 1.

As an example, step 110 may be implemented as steps 212-218 of FIG. 2. At step 212, it is determined whether the reference database contains a matching reference point that is matched with the UE's current positioning-related information. For example, if the difference between the UE's current positioning-related information and a reference point's matching positioning-related information is smaller than or equal to a predefined threshold, this reference point may be considered as a matching reference point.

If the determination result at step 212 is positive (e.g., a matching reference point is found from the reference database), the registration address related information in the matching reference point is determined as the UE's current position information at step 214. The matching reference point may be the UE's own reference point, or may also be any other UE's reference point in the reference database. In the latter case, to achieve a better accuracy, multiple pieces of positioning-related information can be acquired within a short period of time. In a case where these multiple pieces of positioning-related information are matched with another UE's reference point, this matching reference point can be used at step 214. However, it is also possible that the UE's current positioning-related information is compared only with the UE's own reference point at step 212. If they are not matched with each other, steps 216 and 218 are performed which will be described below.

On the other hand, if the determination result at step 212 is negative (e.g., a matching reference point cannot be found from the reference database), the UE's current area is estimated based on its current positioning-related information at step 216. This step may be implemented by using for example enhanced cell ID with propagation model method described above.

Then, at step 218, the UE's current position is determined based on the reference points in the UE's current area and its current positioning-related information. This step may be implemented by using any existing positioning methods. Since the reference points in the UE's current area can provide positioning-related information and known position pairs, the propagation model of the cell can be estimated more exactly, and a better positioning result can still be provided when a matching reference point cannot be found from the reference database.

Figure 3:
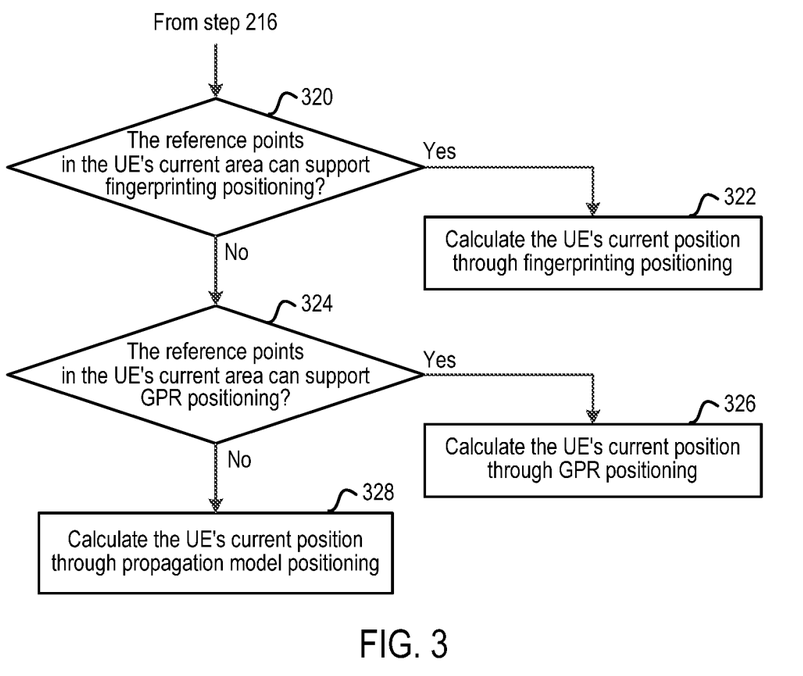
FIG. 3 is a flowchart for explaining the method of FIG. 2.

As an example, step 218 may be implemented as steps 320-328 of FIG. 3. At step 320, it is determined whether the reference points in the UE's current area can support fingerprinting positioning. For example, in a case where there are many reference points in the UE's current area and most of the place in this area is covered by reference points such that a fingerprint database can be set up for this area, or in a case where a fingerprint database has been set up previously for this area, the reference points in the UE's current area can support fingerprinting positioning.

If the determination result at step 320 is positive (e.g., fingerprinting positioning can be supported), the UE's current position is calculated through fingerprinting positioning at step 322. On the other hand, if the determination result at step 320 is negative (e.g., fingerprinting positioning cannot be supported), it is checked at step 324 whether the reference points in the UE's current area can support GPR positioning. For example, in a case where the reference points in the UE's current area are sufficient to derive the GPR parameter $\theta_i$, or in a case where the GPR parameter $\theta_i$ has been derived previously for this area, the reference points in the UE's current area can support GPR positioning.

If the check result at step 324 is positive (e.g., GPR positioning can be supported), the UE's current position is calculated through GPR positioning at step 326. On the other hand, if the check result at step 324 is negative (e.g., GPR positioning cannot be supported), the UE's current position is calculated through propagation model positioning at step 328.

In this way, according to users' registration address related information, the overall UE positioning can be expected to be significantly improved compared to the case where only measured information (e.g., power level information, SNR, TA, AoA) is considered. It should be noted that the present disclosure is not limited to the examples where a fingerprint database or GPR parameter is derived from the reference database. As another example, any other suitable positioning method can also be employed, and its corresponding parameter can also be derived from the reference database.

Figure 5:
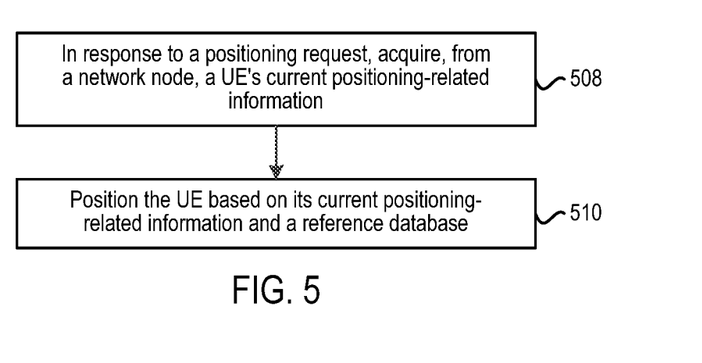
FIG. 5 is a flowchart illustrating a method for positioning UE according to another embodiment of the disclosure.

FIG. 5 is a flowchart illustrating a method for positioning UE according to another embodiment of the disclosure. The method may be performed by for example the processor and the memory of a positioning server. The method of FIG. 5 is similar to that of FIG. 1 except that the reference database is not created but instead is obtained from another positioning server. As shown, the method of FIG. 5 comprises steps 508 and 510.

At step 508, in response to a positioning request, a UE's current positioning-related information is acquired from a network node. This step is similar to step 108, and thus its detailed description is omitted here. Then, at step 510, the UE is positioned based on its current positioning-related information and a reference database. The reference database contains, for each UE of a plurality of UEs, a reference point that comprises the UE's ID, registration address related information and matching positioning-related information that is matched with the registration address related information. The plurality of UEs' registration addresses are obtained from a network provider. Step 510 is similar to step 110, and thus its detailed description is omitted here.

Figure 6:
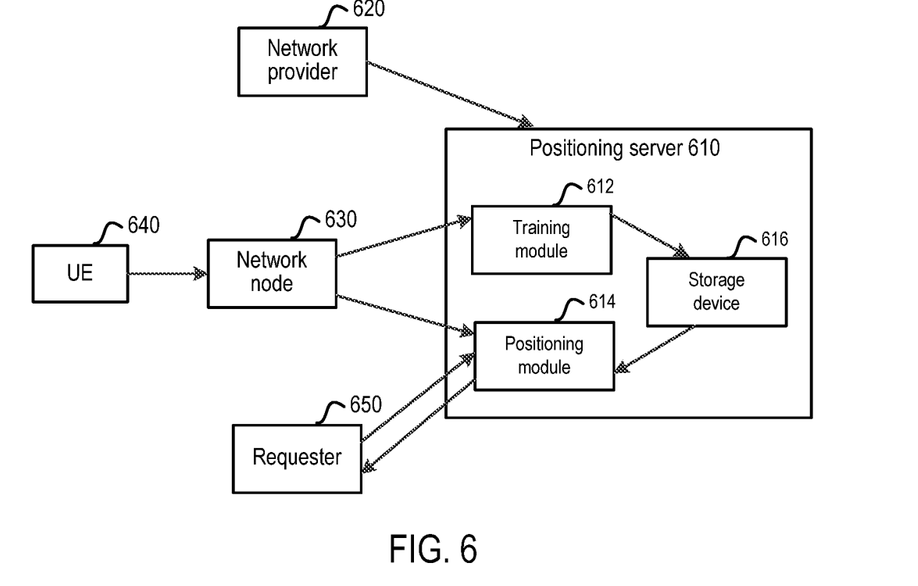
FIG. 6 shows a system to which the principle of the disclosure is applicable.

FIG. 6 shows a system to which the principle of the disclosure is applicable. As shown, the system may comprise a positioning server 610, a network provider 620, a network node 630, a UE 640 and a requester 650. The network provider 620 can provide a plurality of UEs' IDs and registration addresses. The UE 640 can provide its positioning-related information to the network node 630. It should be noted that only one UE is shown in the figure for clarity. The network node 630 can provide the UE 640's positioning-related information to the positioning server 610, and can also create the UE 640's positioning-related information. The requester 650 can issue a positioning request to the positioning server 610 and receive a positioning result from the positioning server 610. The network provider 620, the network node 630, the UE 640 and the requester 650 has been described above, and thus their detailed description is omitted here.

The positioning server 610 may comprise a training module 612, a positioning module 614 and a storage device 616. The training module 612 may be configured to perform steps 102-106 of FIG. 1 and steps 430-434 of FIG. 4. The storage device 616 may store the reference database created by the training module 612. The positioning module 614 may be configured to perform steps 108-110 of FIG. 1 and steps of FIGS. 2-3.

Figure 7:
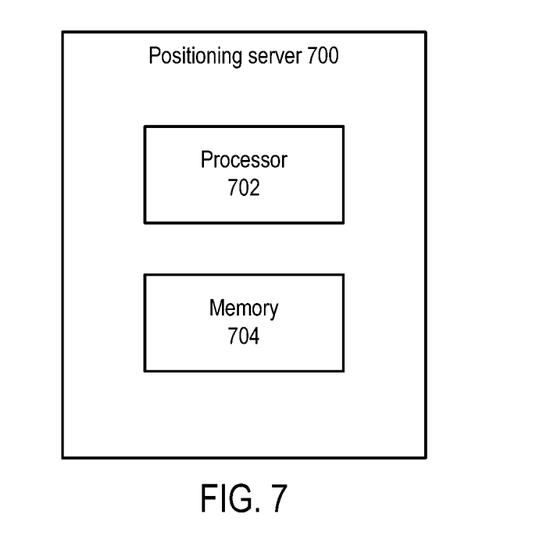
FIG. 7 is a block diagram showing a positioning server according to an embodiment of the disclosure.

FIG. 7 is a block diagram showing a positioning server according to an embodiment of the disclosure. As shown, the positioning server 700 may comprise a processor 702 and a memory 704. The memory 704 contains instructions which may be executed by the processor 702 to cause the positioning server 700 to perform the method steps described above with reference to FIGS. 1-5. The other configurations of the positioning server 610 or 700 may be well known to those skilled in the art, and thus the detailed description thereof is omitted here.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method for positioning user equipment (UE), the method comprising:
    collecting, for each of a plurality of UEs, positioning-related information from at least one network node for at least a first duration of time;
    determining, for each UE, matching positioning-related information that is matched with registration address related information of the UE, wherein registration addresses of the plurality of UEs are obtained from a network provider, wherein determining the matching positioning-related information comprises extracting one or more sets of similar positioning-related information that last for at least a second duration of time, the second duration of time being different from the first duration of time, and wherein the extracting comprises extracting the one or more sets of similar positioning-related information from the collected positioning-related information having cumulative duration greater than or equal to the second duration of time;
    creating a reference database containing, for each UE, a reference point that comprises an identification (ID), the registration address related information, and the matching positioning-related information;
    in response to a positioning request, acquiring, from the at least one network node, current positioning-related information of the UE; and
    positioning the UE based on the current positioning-related information and the reference database.

2. The method according to claim 1, wherein positioning the UE comprises:
    determining whether the reference database contains a matching reference point that is matched with the current positioning-related information;
    in response to a positive determination result, determining the registration address related information in the matching reference point as the current positioning-related information;
    in response to a negative determination result, estimating a current area of the UE based on the current positioning-related information; and
    determining a current position of the UE based on reference points in the current area and the current positioning-related information.

3. The method according to claim 2, wherein determining the current position comprises:
    determining whether the reference points in the current area can support fingerprinting positioning;
    in response to a positive determination result, calculating the current position through the fingerprinting positioning;
    in response to a negative determination result, checking whether the reference points in the current area can support Gaussian process regression (GPR) positioning;
    in response to a positive check result, calculating the current position through the GPR positioning; and
    in response to a negative check result, calculating the current position through propagation model positioning.

4. The method according to claim 1, wherein determining the matching positioning-related information further comprises:
    estimating one or more positions based on the one or more sets of similar positioning-related information; and
    determining, as the matching positioning-related information, the set of similar positioning-related information for which the estimated position is matched with the registration address related information of the UE.

5. The method according to claim 1, wherein the registration address related information comprises the registration address and a ground truth determined based on the registration address.

6. The method according to claim 1, wherein the positioning-related information comprises:
    measured information that is created by the UE or the at least one network node, and can be used to position the UE; and
    time at which the measured information is received or created.

7. The method according to claim 6, wherein the measured information comprises one of, or a combination of the following:
    one or more cell IDs detected by the UE;
    power level and signal-to-noise ratio (SNR) for a signal received by the UE from one or more cells;
    power level and SNR for a signal received by the at least one network node from the UE;
    angle of arrival for a signal received by the at least one network node from the UE; and
    timing advance between the UE and a cell.

8. A positioning server for positioning user equipment (UE), the positioning server comprising:
    a processor; and
    a memory, the memory containing instructions executable by the processor whereby the positioning server is operative to:
    collect, for each of a plurality of UEs, positioning-related information from at least one network node for at least a first duration of time;
    determine, for each UE, matching positioning-related information that is matched with registration address related information of the UE, wherein registration addresses of the plurality of UEs are obtained from a network provider, wherein the positioning server is operative to determine the matching positioning-related information by extracting one or more sets of similar positioning-related information that last for at least a second duration of time, the second duration of time being different from the first duration of time, and wherein the positioning server is further operative to extract the one or more sets of similar positioning-related information from the collected positioning-related information having cumulative duration greater than or equal to the second duration of time;

create a reference database containing, for each UE, a reference point that comprises an identification (ID), the registration address related information, and the matching positioning-related information;

in response to a positioning request, acquire, from the at least one network node, current positioning-related information of the UE; and position the UE based on the current positioning-related information and the reference database.

9. The positioning server according to claim 8, wherein the instructions are executable by the processor whereby the positioning server is operative to position the UE by:
determining whether the reference database contains a matching reference point that is matched with the current positioning-related information;
in response to a positive determination result, determining the registration address related information in the matching reference point as the current positioning-related information;
in response to a negative determination result, estimating a current area of the UE based on the current positioning-related information; and
determining a current position of the UE based on reference points in the current area and the current positioning-related information.

10. The positioning server according to claim 9, wherein the instructions are executable by the processor whereby the positioning server is operative to determine the current position by:
determining whether the reference points in the current area can support fingerprinting positioning;
in response to a positive determination result, calculating the current position through the fingerprinting positioning;
in response to a negative determination result, checking whether the reference points in the current area can support Gaussian process regression (GPR) positioning;
in response to a positive check result, calculating the current position through the GPR positioning; and
in response to a negative check result, calculating the current position through propagation model positioning.

11. The positioning server according to claim 8, wherein the instructions are executable by the processor whereby the positioning server is further operative to determine the matching positioning-related information by:
estimating one or more positions based on the one or more sets of similar positioning-related information; and
determining, as the matching positioning-related information, the set of similar positioning-related information for which the estimated position is matched with the registration address related information of the UE.

12. A positioning server for positioning user equipment (UE), the positioning server comprising:
a processor; and
a memory, the memory containing instructions executable by the processor whereby the positioning server is operative to:
in response to a positioning request, acquire, from a network node, current positioning-related information of the UE; and
position the UE based on the current positioning-related information and a reference database,
wherein the reference database contains, for each UE of a plurality of UEs, a reference point that comprises an identification (ID), registration address related information, and matching positioning-related information that is matched with the registration address related information, wherein the matching positioning-related information is determined by extracting one or more sets of similar positioning-related information that last for at least a second duration of time, wherein the extracting comprises extracting the one or more sets of similar positioning-related information, from positioning-related information collected for at least a first duration of time, having cumulative duration greater than or equal to the second duration of time, wherein the second duration of time is different from the first duration of time, and
wherein registration addresses of the plurality of UEs are obtained from a network provider.

13. The positioning server according to claim 12, wherein the instructions are executable by the processor whereby the positioning server is operative to position the UE by:
determining whether the reference database contains a matching reference point that is matched with the current positioning-related information;
in response to a positive determination result, determining the registration address related information in the matching reference point as the current positioning-related information;
in response to a negative determination result, estimating a current area of the UE based on the current positioning-related information; and
determining a current position of the UE based on reference points in the current area and the current positioning-related information.

14. The positioning server according to claim 13, wherein the instructions are executable by the processor whereby the positioning server is operative to determine the current position by:
determining whether the reference points in the current area can support fingerprinting positioning;
in response to a positive determination result, calculating the current position through the fingerprinting positioning;
in response to a negative determination result, checking whether the reference points in the current area can support Gaussian process regression (GPR) positioning;
in response to a positive check result, calculating the current position through the GPR positioning; and
in response to a negative check result, calculating the current position through propagation model positioning.

* * * * *